Aug. 25, 1936.　　　　G. R. BACON　　　　2,052,378
REMOVABLE RING FOR MOLD WHEELS
Filed Oct. 31, 1935
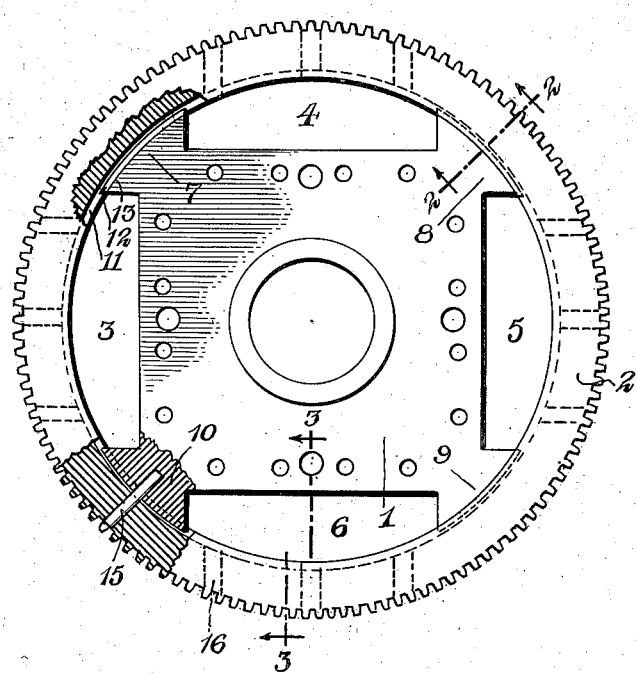
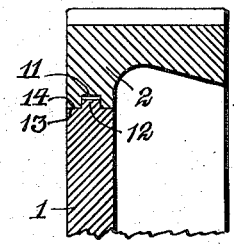
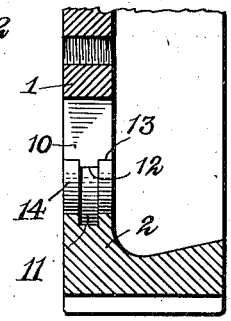
WITNESSES
INVENTOR
George Ross Bacon
BY
Munn, Anderson & Liddy
ATTORNEYS Patented Aug. 25, 1936

2,052,378

UNITED STATES PATENT OFFICE 2,052,378

REMOVABLE RING FOR MOLD WHEELS

George Ross Bacon, Towanda, Pa.

Application October 31, 1935, Serial No. 47,710

2 Claims. (Cl. 199—55)

This invention relates to Linotype mold disks, and has for an object to provide an improved construction which may be utilized as a complete new disk or as a repair attachment therefor.

Another object of the invention is to provide a mold disk for Linotype machines wherein a separate rim is provided for the disk.

A further object, more specifically, is to provide a mold disk for Linotype machines wherein the material of the disk between the mold openings is machined with a bead so as to coact with a steel band or rim having a groove and the usual gear teeth and screw openings.

In the accompanying drawing—

Figure 1 is a side view of a mold disk linotype machine disclosing an embodiment of the invention, certain parts being broken away for better illustrating the construction;

Figure 2 is an enlarged fragmentary sectional view through Figure 1 on line 2—2;

Figure 3 is an enlarged fragmentary sectional view through Figure 1 on line 3—3.

Referring to the accompanying drawing by numeral, 1 indicates a disk body and 2 a band mounted thereon. Heretofore the disk body and band were cast in one piece and formed with usual mold openings 3, 4, 5 and 6. These disks as made heretofore operated satisfactorily until part of the band becomes broken and then a new disk was necessary as it has been heretofore impossible or substantially impossible to repair the disk. In the present invention, means has been provided which may act as a repair attachment or may be made as a complete new structure and when made as a complete new structure the general shape and function is the same as the old disk as far as the linotype machine is concerned.

As shown in the drawing, the body 1 is of the same size and shape as used heretofore and functions the same way so any further description is not thought necessary. However, between mold openings 3 to 6 inclusive there are provided extensions 7, 8, 9 and 10. In the former mold disks these extensions merge integrally into the band, but in the present invention the band 2 is made separately. Preferably, body 1 is made from cast iron so that it can stand the heat and the usual wear and tear while the band or rim 2 is preferably made from steel. The outside shape of this band is the same as the bands heretofore and is provided with teeth in the usual way. However, the inner surface is provided with a groove 11 adapted to accommodate the various segmental beads 12 on the members 7 to 10 inclusive. When making the body 1 originally or when repairing the same, the parts are turned so that the respective edges 13 will be true and will fit snugly against the edges 14 of the band 2. In order to secure this result, the bead 12 is not very high and the parts are proportioned so that the steel band 2 may be shrunk into position shown in Figures 1 and 2 so as to rather lightly press against the members or extensions 7, 8, 9 or 10. In order to prevent any loose motion one or more pins 15 may be used. If desired, screws could be substituted for the pins 14 though ordinarily a snugly fitting pin is satisfactory. Where an old disk is to be repaired the same is turned down to appear as shown by body 1 but where a new disk is being made the body is cast similarly to the body 1 and is then machined to the shape illustrated in Figure 1. By not having a rim cast on the body, the various openings 3 to 6 inclusive may be accurately and easily machined. These openings are the usual openings in disks of this kind for the molds. Whether the structure used at any time is a complete new structure or repair job, the rim 2 will be of steel and will be able to stand rough usage to a better extent than a cast rim; also, in case the rim 2 has become dented or broken or otherwise injured the same may be removed and a new rim applied without the necessity of providing a new body 1. The use of the steel rim is very desirable in several respects and particularly in regard to the various threaded apertures 16 which must be provided in rims of this kind. It will be seen that there are three apertures opposite the respective openings 3, 4, and 5. This is the usual construction but by applicant's steel band 2 greater strength or resistance to breakage is produced while providing these usual threaded apertures. Heretofore the screw holds or threaded apertures 16 caused a comparatively large percentage of breaks and therefore the provision of the steel gear rim or band 2 results in the provision of a stronger rim and one that may be used longer without danger of failure due to the weakness produced by the threaded aperture 16.

I claim:

1. The method of forming a combined mold disk and gear ring consisting in casting a disk body with a plurality of spaced radially extending projections having beads on their outer ends, forming a steel gear ring with gear teeth on the outer surface and with a smooth inner surface having an annular groove, shrinking the steel ring on the ends of said projections so that said beads will rest in said groove, and then applying a pin so that it will connect said ring and one of said projections for locking the ring against accidental independent movement.

2. A combined gear ring and disk body for mold wheels, comprising a cast body having radially extending extensions, each of said extensions having an outwardly extending member at the outer end, a gear ring having gear teeth on its outer surface and a groove on its inner surface, the inner surface of said ring fitting snugly against the outer ends of said extensions with the extending members carried by the extensions projecting into said groove, and means for locking said ring against independent accidental movement around said body.

GEORGE ROSS BACON.